(12) United States Patent
Fermigier et al.

(10) Patent No.: US 12,468,181 B2
(45) Date of Patent: Nov. 11, 2025

(54) EYEGLASS DEVICE AND METHOD FOR DRIVING A VARIABLE TRANSMISSION OPHTHALMIC LENS

(71) Applicant: Essilor International, Charenton-le-Pont (FR)

(72) Inventors: Bruno Fermigier, Charenton-le-Pont (FR); Cédric Gilbert, Charenton-le-Pont (FR); Alexandre Gourraud, Charenton-le-Pont (FR); Marius Peloux, Charenton-le-Pont (FR); Vincent Roptin, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 371 days.

(21) Appl. No.: 18/000,842

(22) PCT Filed: Jun. 23, 2021

(86) PCT No.: PCT/EP2021/067238
§ 371 (c)(1),
(2) Date: Dec. 6, 2022

(87) PCT Pub. No.: WO2021/260060
PCT Pub. Date: Dec. 30, 2021

(65) Prior Publication Data
US 2023/0213787 A1    Jul. 6, 2023

(30) Foreign Application Priority Data
Jun. 26, 2020    (EP) ..................... 20305720

(51) Int. Cl.
*G02C 7/10*     (2006.01)
*G02C 11/00*    (2006.01)

(52) U.S. Cl.
CPC ............. *G02C 7/101* (2013.01); *G02C 11/10* (2013.01)

(58) Field of Classification Search
CPC ............. G02B 27/0172; G02B 27/017; G02B 2027/0178; G02B 2027/014;
(Continued)

(56) References Cited

U.S. PATENT DOCUMENTS

| 4,021,935 A | 5/1977 | Witt |
| 4,106,217 A | 8/1978 | Witt |

(Continued)

FOREIGN PATENT DOCUMENTS

| EP | 2923234 B1 * | 12/2016 | ............. A61F 9/023 |
| EP | 3 588 173 A1 | 1/2020 | |

OTHER PUBLICATIONS

Machine translation of EP-2923234-B1 (Year: 2016).*

(Continued)

*Primary Examiner* — Pinping Sun
*Assistant Examiner* — Matthew Y Lee
(74) *Attorney, Agent, or Firm* — Oblon, McClelland, Maier & Neustadt, L.L.P.

(57) ABSTRACT

An eyeglass device including a variable transmission ophthalmic lens, a method for driving the transmission of such lens, and a non-transitory computer-readable storage medium for implementing such method. The eyeglass device comprises a light sensor configured for measuring an amount of light in the environment of a wearer and a controlling circuit configured for receiving at least light data from said light sensor and for driving the transmission of said ophthalmic lens on the basis of said light data. The controlling circuit is configured for driving the transmission of said ophthalmic lens on the basis further of movement (Continued)

data, said movement data being derived from an estimation of a movement of the wearer's head.

18 Claims, 2 Drawing Sheets

(58) Field of Classification Search
CPC ........ G02B 27/0093; G02B 2027/0187; G02B 27/0101; G02B 2027/0138; G02B 2027/0118; G06F 3/012; G02C 11/10; G02C 7/101; G02C 7/083; G02C 7/02; G02C 7/027
See application file for complete search history.

(56) References Cited

U.S. PATENT DOCUMENTS

| | | | | |
|---|---|---|---|---|
| 4,152,846 | A * | 5/1979 | Witt | G02F 1/13306 2/432 |
| 4,482,326 | A * | 11/1984 | Witt | G09B 9/165 348/122 |
| 10,874,164 | B1 * | 12/2020 | Jarrett | G02B 27/0176 |
| 2008/0151175 | A1 | 6/2008 | Gross | |
| 2015/0138224 | A1 * | 5/2015 | Kim | G09G 3/38 345/592 |
| 2017/0090198 | A1 * | 3/2017 | Takagi | G02B 27/0172 |
| 2017/0323615 | A1 * | 11/2017 | Hazra | G06T 11/60 |
| 2018/0210236 | A1 * | 7/2018 | Peloux | G02F 1/13318 |
| 2021/0132418 | A1 * | 5/2021 | Muramatsu | G06F 3/0416 |

OTHER PUBLICATIONS

International Search Report mailed on Aug. 10, 2021 in PCT/EP2021/067238 filed on Jun. 23, 2021 (citing references 1-6 & 15 therein, 4 pages).

* cited by examiner

EYEGLASS DEVICE AND METHOD FOR DRIVING A VARIABLE TRANSMISSION OPHTHALMIC LENS

FIELD OF THE INVENTION

The present invention belongs to the field of ophthalmic lenses.

In particular, eyeglass devices comprising variable transmission ophthalmic lenses are disclosed hereinafter, as well as methods for controlling the optical transmission of such variable transmission ophthalmic lenses, and computer readable storage media, computer programs and base stations implementing such methods.

BACKGROUND OF THE INVENTION

Some known variable transmission ophthalmic lenses comprise an electrochromic material, for example in the form of liquid crystals or in the form of dyes plunged in a fluid.

The transmission of an optical element made out of an electrochromic material is controllable by arranging the optical element between two electrodes and by adjusting a difference of potential between the two electrodes.

Therefore, a user does not need to switch between prescription glasses and solar glasses, but instead may simply use a single optical equipment comprising such electrochromic material and switch the electrochromic material from a clear state to a dark state and back.

It is further known to adapt the transmission of an optical lens comprising an electrochromic material automatically as a function of the amount of ambient light incoming on the optical lens. In other words, it is known to sense an amount of ambient light in the direction in which a wearer is looking and to automatically adapt the transmission of the optical lens based on this sensed amount of ambient light.

In some situations, this is rather advantageous, for example when looking in the direction of the sun or when turning its back on it. Indeed, automatically switching from a clear state to a dark state when looking at the sun avoids glare. Automatically switching from a dark state to a clear state when turning one's back on the sun allows providing a brighter view.

However, in other situations, the change of transmission automatically induced by the change in luminosity may be rather uncomfortable and is unwanted.

One such example is when the wearer is driving and briefly checking a rear mirror or a side mirror. In this example, a reflection of a light source in the mirror, such as the sun, or such as a headlight from another vehicle, may induce a sudden increase in luminosity. In this example, automatically changing the transmission of the optical lens from a bright state to a dark state as a result of such luminosity increase, then automatically changing the transmission of the optical lens back to the bright state when the wearer has finished checking the mirror, may hinder the wearer and is thus undesirable.

Another such example is when the wearer is playing tennis in broad daylight and looks down while serving. In this example, looking down induces a sudden decrease of incoming light. In this example, automatically changing the transmission of the optical lens from a dark state to a bright state as a result of such luminosity increase, then automatically changing the transmission of the optical lens back to the dark state when the wearer stops looking down, also may hinder the wearer and is thus undesirable.

There is therefore a need for eyeglass devices having variable transmission ophthalmic lenses which may automatically adapt the transmission to the ambient light conditions, while also preventing hindering a wearer by undesirable variations of the transmission.

SUMMARY OF THE INVENTION

The invention is defined by the appended independent claims. Additional features and advantages of the concepts herein disclosed are set forth in the description which follows.

The present disclosure aims at improving the situation.

In particular, one aim of the invention is to provide a method for controlling variable transmission ophthalmic lenses which enhances the comfort of the wearer whose head is having transient or abrupt movements.

To this end, the present disclosure describes an eyeglass device intended to be worn by a wearer, the eyeglass device comprising at least:
  a variable transmission ophthalmic lens,
  a light sensor configured for measuring an amount of light in the environment of the wearer,
  a controlling circuit configured for receiving at least light data from said light sensor and for driving the transmission of said ophthalmic lens on the basis of said light data, wherein the controlling circuit is configured for driving the transmission of said ophthalmic lens on the basis further of movement data, said movement data being derived from an estimation of a movement of the wearer's head.

In the context of the disclosure, the variable transmission ophthalmic lens has an initial transmission value at an initial instant.

In the context of the disclosure, the light sensor is configured for measuring, or sensing, said amount of light in the environment of the wearer over time.

In the context of the disclosure, the light data which are received by the controlling circuit from the light sensor may indicate a variation over time of the amount of light sensed by the light sensor between the initial instant and a later instant. Said variation over time may be extracted from the light data by the controlling circuit.

In the context of the disclosure, the movement data may be derived from an estimation of one or more movements of the wearer's head between the initial instant and the later instant.

Of course, the controlling circuit may be configured to receive the light data from a plurality of such light sensors.

Of course, the controlling circuit may be configured to drive a plurality of such variable transmission ophthalmic lenses.

By automatically driving the transmission of the ophthalmic lens both on the basis of light data and on the basis of movement data, it is possible to adapt the transmission differently for two different events even though similar changes in the intensity of incoming light occur in both events.

Indeed, automatically driving the transmission of the ophthalmic lens on the basis of light data, such eyeglass device allows providing a suitable transmission to a wearer accounting for the intensity of ambient light. For example, in broad daylight, the wearer may be provided a dark state when facing the sun and a clear state while turning its back on the sun.

Moreover, unlike existing eyeglass devices, it is possible to avoid unwanted transmission variations due to automatically driving the transmission of the ophthalmic lens also on the basis of movement data. Examples of such unwanted transmission variations correspond to events where the wearer turns one's head towards a light source, which results in a change of intensity of incoming light.

In the context of the disclosure, it is implied that the controlling circuit is configured to obtain the movement data prior to driving the transmission of the ophthalmic lens on the basis of said movement data.

The movement data may be obtained directly from a movement sensor, which may or may not be part of the eyeglass device.

Indeed, optionally, the eyeglass device may further comprise a movement sensor configured for sensing a movement of the wearer's head, and the controlling circuit may be further configured for obtaining the movement data by receiving, from the movement sensor, said movement data, indicating the movement of the wearer's head sensed by the movement sensor. In this example, the device is standalone.

Alternately, the controlling circuit comprises a communication interface with a remote equipment, for instance, a smartphone, equipped with a movement sensor, and the controlling circuit is further configured for receiving, from the movement sensor of the remote equipment, movement data indicating the movement of the wearer's head sensed by the movement sensor between the initial instant and the later instant. In this example, the proposed eyeglass device may be obtained simply by updating an embedded software of a controlling circuit of a preexisting eyeglass device comprising a light sensor and devoid of movement sensor, so that the controlling circuit becomes configured for driving the transmission of said ophthalmic lens on the basis of movement data received from the remote equipment.

The movement data may be obtained directly from a plurality of movement sensors, each of which may or may not be part of the eyeglass device. Indeed, optionally, the device further comprises an additional movement sensor, and the controlling circuit is further configured for receiving additional movement data from said additional movement sensor and to detect a characteristic movement of the head of the wearer based on both the movement data and the additional movement data. Multiple movement sensors may allow for example for a more accurate determination and characterization of a movement of the head of the wearer, such as, in a given reference frame, rotations of the head of the wearer according to two space coordinates. It is thus possible to more accurately sense both an up/down component and a left/right component of a given rotation of the head.

Moreover, additional movement sensors may provide additional movement information that are not necessarily directly related to the movement of the head of the wearer. For example, a geolocation sensor may help identifying different predefined situations or activities of the wearer. An example of such a situation is a quick geographic movement of the wearer, which may be associated for instance to a driving activity. Another example of such a situation is the wearer remaining mostly static. Considering a given movement of the head of the wearer as detected by the movement sensor, the controlling device may be configured to drive the transmission function of the ophthalmic lens according to different possible control functions depending on the additional movement data, i.e. based on the current situation or activity of the wearer.

It is also possible for the movement data to be estimated by the controlling circuit rather than obtained from a movement sensor. Indeed, optionally, the controlling circuit is further configured for obtaining the movement data by estimating the movement of the wearer's head based on the received light data.

More precisely, specific variations of the amount of light in the environment over time may be interpreted as corresponding to a movement of the wearer's head, therefore the movement of the wearer's head may be estimated based on specific variations over time of the light data obtained from the light sensor.

In this example, the proposed eyeglass device may be obtained simply by updating a software to configure the controlling circuit of a preexisting eyeglass device comprising a light sensor and devoid of movement sensor such that the movement data get inferred from the light data obtained from the light sensor.

Optionally, the controlling circuit is configured for:
determining, based on the movement data, whether the sensed movement of the wearer's head matches a predefined movement, then
in case of determining an absence of a match, driving the transmission of the lens according to a first control function defining a first transmission value to be reached by the lens on the basis of said light data according to a first set of rules, the controlling circuit being thereby operated in a default mode, and
in case of determining a match, driving the transmission of the lens according to a second control function defining a second transmission value to be reached by the lens according to a second set of rules, the controlling circuit being thereby operated in a specific mode,
the second set of rules being different from the first set of rules.

In this example, the transmission value to be reached differs based on whether or not the movement of the head of the wearer matches a predefined movement. More precisely, the light data is taken into account for determining the transmission value to be reached only if the sensed movement matches the predefined movement.

An example of such a predefined movement may be turning the head left at a predefined speed and/or up to a predefined angle.

In order to determine, based on the movement data, whether the sensed movement of the wearer's head matches at least one predefined movement, reference movement data indicative of several such predefined movements may be stored beforehand as a movement database in a memory of the controllable circuit, and the controllable circuit may be configured to retrieve the movement database and to compare the obtained movement data with the movement database.

Optionally, upon detection of a change of the amount of light measured by the light sensor,
said first control function varies between an initial transmission value and a target transmission value, the target transmission value to be reached being determined as a function of the amount of light measured according to a first rule of the first set of rules, and
said second control function varies between an initial transmission value and a target transmission value, the target transmission value to be reached being determined as a function of a measured illuminance according to a first rule of the second set of rules, wherein the first rule of the first set of rules is different from the first rule of the second set of rules so that the target transmission value of the first control function is different from the target transmission value of the second control function.

Optionally, upon detection of a change of the amount of light measured by the light sensor:

said first control function varies between the initial transmission value and the target transmission value according to a first transition function, said first transition function defining a first transition duration for reaching the target transmission value, said second control function varies between the initial transmission value and the target transmission value according to a second transition function, said second transition function defining a second transition duration, the first transition duration being different from the second transition duration.

In this example, the control function may be adaptative to the movement data, not only regarding the transmission value to be reached, but also regarding the transition duration from an initial transmission value to the transmission value to be reached. For example, for some predefined head movements of the wearer, switching from a clear state to a dark state may be performed deliberately slowly in order to allow a better accustoming of the wearer to the dark state, thus providing a better comfort to the wearer.

Optionally, the transmission of said ophthalmic lens being equal to an initial transmission value at an initial instant, the controlling circuit is configured for:

determining, based on the movement data, whether the sensed movement of the wearer's head matches a predefined movement, then in case of determining an absence of a match, driving the transmission of the lens according to a first control function defining a first transmission value to be reached by the lens on the basis of said light data according to a first set of rules, the controlling circuit being thereby operated in a default mode, and in case of determining a match, driving the transmission of the lens according to a second control function defining a second transmission value to be reached by the lens according to a second set of rules, the controlling circuit being thereby operated in a specific mode, the second set of rules being different from the first set of rules, and said first and second transmission values to be reached both being different from the initial transmission value.

As a result, depending on a combination of the movement data and of the light data, the controlling circuit selects either a default transmission mode or a specific transmission mode. Both modes define a corresponding transmission value to be reached. Both corresponding transmission values are different from the initial transmission value of the lens at the time of selecting the transmission mode. The transmission of the lens is then driven and varies according to the corresponding transmission value to be reached.

Optionally, the second control function is a constant function so that driving the transmission of the lens according to the second control function corresponds to keeping the transmission of the lens unchanged from the initial transmission value. In this example, automatically switching states of the ophthalmic lens as a result of a variation of intensity of the incoming light may be disabled if the current head movement of the wearer is identified as being part of a database of predefined head movements of the wearer. This allows disabling unwanted transmission changes.

The present disclosure further describes a method for driving the transmission of a variable transmission ophthalmic lens, the method being implemented by a controlling circuit and comprising:

receiving, from a light sensor configured for measuring an amount of light in an environment of the wearer, at least light data from said light sensor, driving the transmission of said ophthalmic lens on the basis of said light data and on the basis further of movement data, said movement data being derived from estimation of movements of the wearer's head.

Optionally, the method further comprises:

determining, in absence of detection of a characteristic movement of the wearer detected based on said movement data, a first control function defining transmission values to be reached by the variable transmission ophthalmic lens on the basis of said light data according to a first set of rules, the controlling circuit being thereby operated in a default mode, and determining, upon detection of a characteristic movement of the head of the wearer based on said movement data, a second control function defining transmission values to be reached by the variable transmission ophthalmic lens according to a second set of rules, the controlling circuit being thereby operated in a specific mode, the second set of rules being different from the first set of rules.

Optionally, the transmission of the ophthalmic lens being equal to an initial transmission value at an initial instant, the method further comprises:

determining, based on the movement data, whether the sensed movement of the wearer's head matches a predefined movement, then determining, in absence of detection of a characteristic movement of the wearer based on said movement data, a first control function defining transmission values to be reached by the variable transmission ophthalmic lens on the basis of said light data according to a first set of rules, the controlling circuit being thereby operated in a default mode, and determining, upon detection of a characteristic movement of the head of the wearer based on said movement data, a second control function defining transmission values to be reached by the variable transmission ophthalmic lens according to a second set of rules, the controlling circuit being thereby operated in a specific mode, the second set of rules being different from the first set of rules, and said transmission values to be reached both being different from the initial transmission value.

Optionally:

upon detection of a change of the amount of light measured based on information provided by the ambient light sensor, said first control function varies between an initial transmission value and a target transmission value, the target transmission value to be reached being determined as a function of the amount of light measured according to a first rule of the first set of rules, and said second control function varies between an initial transmission value and a target transmission value, the target transmission value to be reached being determined as a function of a measured illuminance according to a first rule of the second set of rules, wherein the first rule of the second set of rules is different from the first rule of the second set of rules so that the target transmission value of the first control function is different from the target transmission value of the second control function.

Optionally, upon detection of a change of the amount of light measured by the light sensor:

said first control function varies between the initial transmission value and the target transmission value according to a first transition function, said first transition function defining a said second control function varies between the initial transmission value and the target transmission value according to a second transition function, said second transition function defining a second transition duration, the first transition duration being different from the second transition duration.

Optionally, the second function is a constant function so that the initial transmission value remains unchanged when a specific head movement is detected while a change of the amount of light is detected.

The present disclosure further describes a computer program product comprising a series of instructions that, when executed by a processor, cause the processor to carry out any of the above methods.

The present disclosure further describes a non-transitory computer-readable storage medium storing the above computer program.

DETAILED DESCRIPTION

Figure 1:
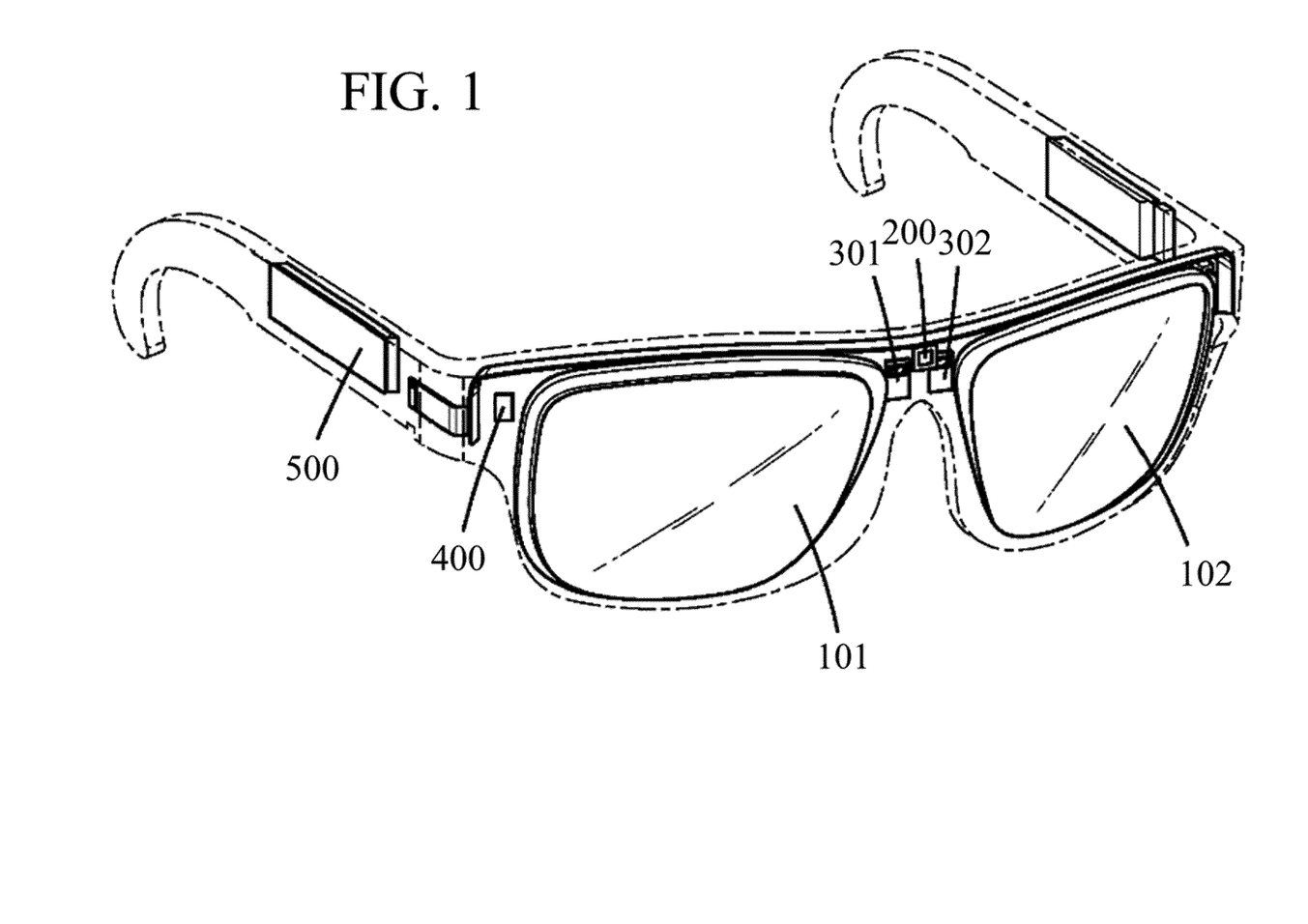
FIG. 1 illustrates an exemplary eyeglass device.

It is now referred to FIG. 1 which illustrates an exemplary eyeglass device.

Alternative terms for an eyeglass device are a head-mounted device

The eyeglass device comprises:
a pair of eyeglasses (101,102) mounted on a spectacle frame,
a light sensor (200) configured to sense a level of visible light incoming towards the eyeglasses (101,102), and
for each of the eyeglasses (101,102), a processing circuit (301,302) operably coupled to the light sensor (200).

The processing circuit (301,302) is operably coupled to the eyeglasses (101,102), for example by transmitting command signals to said eyeglasses to drive their transmission. Alternately, the eyeglass device may comprise a single processing circuit for driving the transmission of both eyeglasses.

The eyeglass device may further comprise one or more movement sensors (400), configured to sense a position, a speed or an acceleration relating to a linear or rotary movement of the eyeglass device, the one or more movement sensors (400) being operably coupled to the processing circuit (301,302).

The eyeglass device may comprise one or more power sources (500) for providing electrical power to the eyeglasses (101,102), to the sensors (200, 400) and to the processing circuit (301,302).

The eyeglasses (101,102) are variable transmission ophthalmic lenses which are, directly or indirectly, electrically switchable.

For example, the eyeglasses (101,102) may comprise an electrochromic material, which visible light transmission properties are electrically switchable.

For example, the eyeglasses (101,102) may comprise a thermochromic material, which visible light transmission properties are thermally switchable, associated to an electrical conductor which temperature may be controlled by the passage of an electric current.

More generally, the eyeglasses (101,102) may be based on any smart glass technology or combination thereof, such as electrochromic, thermochromic, photochromic, suspended-particle, micro-blind or polymer-dispersed liquid-crystal technologies.

Light sensors are photoelectric devices that converts light energy of visible light, detected by the device, to electrical energy. Examples include photoresistors, photodiodes, and phototransistors.

The light sensor (200) may be mounted on the spectacle frame, such as on the nose bridge, on the lens mount, on a hinge, on an arm, etc.

The eyeglass device may comprise one or more additional light sensors (200).

For example, the eyeglass device may comprise a pair of identical light sensors (200), each mounted close to a corresponding ophthalmic lens, in order to sense separately the incoming light towards each of the eyeglasses (101,102).

For example, the eyeglass device may comprise a plurality of light sensors (200), each being sensitive to different visible light wavelengths, in order to sense separately blue light and red light for example, in order to apply different control functions to the ophthalmic lenses depending on the spectrum of the incoming visible light.

Movement sensors are devices that are able to measure a position or orientation, a linear or rotary speed, or a linear or rotary acceleration of a monitored body. In the context of the invention, the monitored body is the head of the wearer.

Examples of movement sensors include position encoders, accelerometers, gyroscopes and gyrometers. The eyeglass device may comprise a combination of different types of movement sensors as an inertial measurement circuit, which may allow sensing and reporting for instance a specific force, an angular rate and an orientation of the head of the wearer.

Each movement sensor (400) may be mounted on the spectacle frame, such as on the nose bridge, on the lens mount, on a hinge, on an arm, etc.

The processing circuit (301,302) may comprise one or more processors operably coupled to one or more memories and to one or more communication interfaces with the eyeglasses (101,102) and with the sensors (200, 400). Communication between the processing circuit and the sensors may be wired or wireless. In particular, a wireless communication may allow collecting information not only from the sensors embedded in the eyeglass device but also from any remote equipment equipped with sensors.

For example, the processing circuit may be configured to collect activity data from a processing circuit of a remote equipment and/or geolocation data from a GPS embedded in a remote equipment. Examples of such remote equipments include a smartphone, an electronic control circuit of a vehicle, or an electronic watch. Driving activities, running activities or the like may be inferred from the geolocation data.

At an initial instant, the eyeglass device being worn by a wearer, the eyeglasses (101,102) have an initial transmission value.

Figure 2:
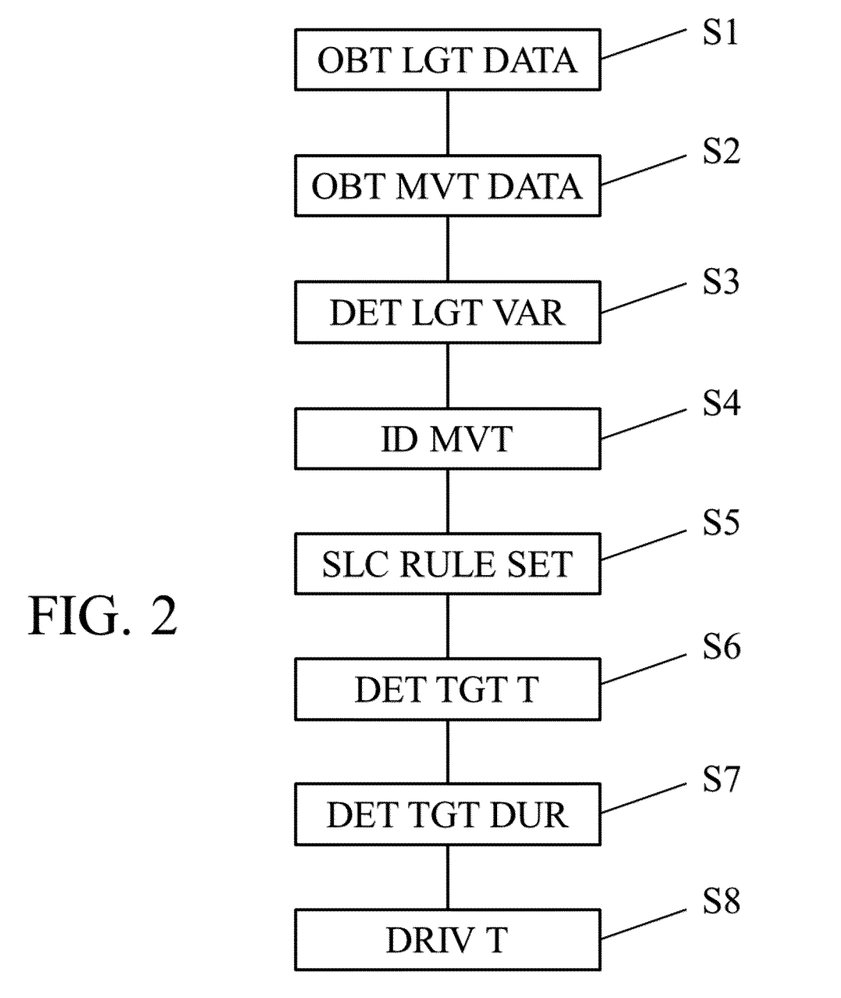
FIG. 2 depicts a flowchart of a general algorithm of an exemplary software for carrying out a proposed method for controlling the device of FIG. 1.

It is now referred to FIG. 2 which illustrates an algorithm of a software that may be stored on a memory and executed by a processor of the processing circuit (301,302) to carry out a method for driving the transmission of the eyeglasses (101,102), starting from the initial transmission value at the initial instant.

Light data are obtained OBT LGT DATA (S1) by the processing circuit (301,302) from the at least one light sensor (200).

It is considered for instance, as a light sensor (200), a photodiode mounted on the eyeglass device. The photodiode outputs, at any given instant, an electrical signal which current is a function of the amount of visible light incoming onto the photodiode.

More generally, the at least one light sensor (200) output electrical signals over time. These electrical signals carry, or enclose, light data which indicate an amount of incoming visible light in the environment of the wearer. Said light data are transmitted to the processing circuit (301,302).

For example, the obtained light data may indicate:
- an initial amount of incoming visible light in the environment of the wearer at the initial instant, and
- a current amount of incoming visible light in the environment of the wearer at a current instant, i.e. after the initial instant.

Said obtained light data may be stored by the processing circuit as time series for further processing.

Movement data are obtained OBT MVT DATA (S2) by the processing circuit (301,302).

In some examples, the movement data may be derived from the light data. Indeed, some specific variations of incoming visible light sensed by one or more light sensors may be due to a movement of the head of the wearer.

For example, when driving at night, the light conditions are mostly dim. It may happen that an intense source of light, such as the headlights of a vehicle may show in a mirror. In such a case, when the driver turns their head towards the mirror, the amount of incoming light sensed by the light sensor equipping the eyeglass device worn by the wearer increases. Movement data indicating such head movement may be derived by the processing circuit (301,302) from the obtained light data which indicate such increase. For example, some specific variations of light data over time may be associated in a correspondence table to some predefined head movements of the wearer.

In some examples, the movement data may be obtained from one or more movement sensors (400) of the eyeglass device.

It is considered for instance, as a movement sensor (400), an accelerometer mounted on the eyeglass device. The accelerometer outputs, at any given instant, an electrical signal which current is a function of the linear acceleration of the eyeglass device in a given direction. Since in the context of the disclosure, the eyeglass device is worn, said linear acceleration may be used to estimate a movement either of the wearer or of the head of the wearer in said given direction.

More generally, if the eyeglass device is equipped with one or more movement sensors (400), said one or more movement sensors (400) may output electrical signals over time. These electrical signals carry, or enclose, movement data which are related to a movement of the head of the wearer. Said movement data are transmitted to the processing circuit (301,302).

In some examples, the movement data may be obtained from one or more movement sensors of a remote equipment.

It is considered for example, as a remote equipment, a smartphone equipped with a camera. If the wearer is currently driving a vehicle, the smartphone being located in the vehicle and facing the wearer, the camera of the smartphone may be used to determine a real movement of the head of the wearer that is not related to a movement of the vehicle. Such determination may be transmitted to the processing circuit of the eyeglass device as movement data. More generally, remote equipments equipped with movement sensors may be used to determine a movement of the head of the wearer. Said movement data are transmitted to the processing circuit (301,302).

Additional sensors, such as additional movement sensors, geolocation sensors, acoustic sensors, pulse sensors, etc. may be used to detect a type of activity of the wearer. For example, an electronic watch equipped with a pulse sensor and/or with a geolocation sensor may be used to determine when the wearer is currently running. Such determination is transmitted, as activity data, to the processing circuit (301, 302).

It has been described above that the movement data may be obtained from various sources, i.e. for instance derived from the light data, or received from movement sensors (400) equipping the eyeglass device, or received from movement sensors equipping remote devices. It shall be noted that it is also possible to obtain the movement data from a combination of sources.

In some examples, variations of the amount of incoming visible light over time are detected DET LGT VAR (S3), or monitored, by the processing circuit (301,302) based on the obtained light data.

An example of a variation of incoming light over time is a difference between the initial amount of incoming visible light in the environment of the wearer at the initial instant and the current amount of incoming visible light in the environment of the wearer at the current instant, i.e. after the initial instant.

Indeed, the amount of incoming visible light is a function of time and the variations of said amount over time may be detected by differentiating said function.

Therefore, if the amount of incoming light continually decreases over a predetermined time interval beginning at the initial instant and ending at the current instant, then the first derivative is negative over said predetermined time interval. Conversely, if the amount of incoming light continually increases over the predetermined time interval, then the first derivative is positive over said predetermined time interval.

The determined variations of incoming visible light over time are related to the variations in the level of ambient visible light in the environment of the wearer over time. The ambient visible light originates from one or more light sources in the environment of the wearer and the sensed amount of visible light depends of the relative position of these one or more light sources with respect to the eyeglass device. The position of the eyeglass device over time is closely related to the variations of the position and/or of the orientation of the head of the wearer over time.

From what precedes, it may be considered that the determined variations of incoming visible light are not only related to variations in the amount of ambient visible light in the environment of the wearer but are also related to variations of position and/or of orientation of the head of the wearer.

In some examples, variations of position and/or of orientation of the head of the wearer over time are detected, or monitored, by the processing circuit (301,302) based on the obtained movement data.

In come examples, specific movements of the head of the wearer are identified ID MVT (S4) by the processing circuit (301,302) based on the obtained movement data, or based on the determined variations of position and/or of orientation of the head of the wearer over time.

Examples of specific movements may include specific linear movements along a given axis, such as a vertical or a horizontal axis.

Specific linear movements may include linear movements exceeding a predetermined distance, or linear movements exceeding a predetermined speed, or linear movements exceeding a predetermined acceleration.

In an example, a specific movement may correspond to a motion of the head of the wearer in a particular direction with a particular velocity or acceleration profile or value.

Examples of specific movements may include specific rotary movements around a given axis, such as a vertical or a horizontal axis.

Specific rotary movements may include rotary movements exceeding a predetermined angle, or rotary movements exceeding a predetermined angular speed, or rotary movements exceeding a predetermined rotary acceleration.

Examples of specific movements may include combinations of rotary and linear movements, which correspond to a simultaneous change of position and of orientation of the head of the wearer.

Examples of specific movements may include successions of the above identified movements, which correspond to a sequence of successive changes of position and/or of orientation of the head of the wearer.

Various examples of specific movements may be stored in a movement database and may correspond to different situations.

As an example, a specific movement may be a back-and-forth movement corresponding to the wearer being driving and turning their head briefly to the side towards a side mirror and back.

As an example, a specific movement may be a downwards movement corresponding to the wearer bending towards the ground, such as while golfing, or serving while playing tennis.

In some examples, a rule set may be selected SLC RULE SET (S5) by the processing circuit (301,302) based on the light data and/or based on the movement data. The rule set is selected among a plurality of predetermined rule sets. The selected rule set is then used to determine a driving function for driving the transmission of the eyeglasses (101,102). In other words, the transmission of the eyeglasses (101,102) may be driven based on different possible driving functions, with each possible driving function being determined on the basis of a corresponding rule set.

Selecting the rule set may be triggered based on at least one preset condition depending on one or more of the light data, the movement data, activity data, and any other data that may be available to the processing circuit (301,302) such as time data provided by an internal clock or meteorological data downloaded from a remote server.

In some examples, a preset condition may correspond to whether the amount of incoming visible light varies. In those examples, selecting the rule set is triggered based on detecting a variation of the amount of incoming visible light over time exceeding a predetermined level. Indeed, if no, or little, variation of the amount of incoming visible light is detected between the initial instant and the current instant, then there is no reason to modify the transmission of the eyeglasses (101,102) at the current instant and the current transmission value may remain equal to the initial transmission value. Conversely, if a large variation of the amount of incoming visible light is detected between the initial instant and the current instant, then it may be desirable to drive the transmission of the eyeglasses (101,102) so that the current transmission value at the current instant is different from the initial transmission value and, for instance, compensates for the variation of the amount of incoming visible light.

In some examples, a preset condition may be inferred from the data available to the processing circuit (301,302) and correspond to the current activity, the current time of day, the current meteorological conditions, etc. In particular, the current type of activity of the wearer may provide an extra condition to be fulfilled to trigger the selection of a rule set. For instance, during an outdoor activity at daytime with a cloudy weather with some bright intervals, luminosity changes may be expected, and the transmission of the eyeglasses (101,102) may be driven accordingly to adapt to the alternance of sunny and cloudy intervals.

Conversely, while, for example, driving at night, the ambient light conditions are expected to remain substantially constant and the transmission of the eyeglasses (101,102) may be driven accordingly to disregard any brief substantial variations of amount of incoming visible light.

Multiple rule sets may be predefined and may correspond to different situations.

In some examples, a specific rule set may be associated to a predetermined specific movement of the head of the wearer. In those examples, selecting said specific rule set is based on the movement data, and in particular to whether the current movement of the head of the person matches the predetermined specific movement. For example, upon detecting brief and frequent movements of the head of the wearer, such as during sports activities or other physical activities, a specific rule set may be selected, so that the eyeglasses (101,102) may be driven in a specific mode in which the transmission of the eyeglasses (101,102) is kept to a constant value, in order to avoid transmission variations that may be detrimental to the wearer during said activity.

A plurality of expected movement data, each corresponding to a predetermined specific movement may be associated in a database to corresponding specific rule sets.

The movement data currently obtained by the processing circuit (301,302) may be compared to the expected movement data, and, upon finding a match, the specific rule set associated to the matching movement data is selected.

Extra data may also be considered, in combination with the movement data, to select a specific data set. Indeed, in some examples, a plurality of expected activity data, each corresponding to a specific type of activity of the wearer may be associated in the database to an array of expected movement data and to corresponding specific rule sets. As such, whenever the activity data matches an expected type of activity data, the movement data currently obtained by the processing circuit (301,302) may be compared to the expected movement data associated to said expected type of activity data. Upon finding a match, the specific rule set associated to the matching movement data and to the matching type of activity data may be selected.

If the current movement of the head of the wearer does not match any predetermined specific movement, or if the head of the wearer remains substantially immobile for an extended period, a default rule set may be selected, so that the eyeglasses (101,102) may be driven in a default mode in which the transmission of the eyeglasses (101,102) may, for instance, be adapted to compensate for the variations in the sensed amount of visible light over time.

Based on the selected rule set, which is either a specific rule set or the default rule set, a control function may be determined by the processing circuit (301,302) in view of driving the transmission of the eyeglasses (101,102).

The control function defines how the transmission may be driven from the initial transmission value to a target transmission value to be reached. The control function may be continuous or discrete, i.e. imply different intermediate levels of transmission. The control function may specify a transition duration defining a timespan for driving the transmission from the initial transmission value to the target transmission value to be reached.

In some examples, the target transmission value to be reached may be determined DET TGT T (S6) by the processing circuit (301,302) based on the selected rule set.

More particularly, each rule set may comprise a first rule for determining the target transmission value to be reached as a function of the measured amount of incoming light at the current instant.

The first rule may be different between a given specific rule set and the default rule set. Since the rule set may be selected based on the current movement of the head of the wearer, the determined target transmission value to be reached may be different for instance, whether said movement matches a predefined specific movement or not.

In an example, the first rule of the specific rule set may be such that the specific target transmission value to be reached in the specific mode is always kept within specific boundary values which define a portion of the allowed transition value range in the default mode.

In an example, the first rule of the specific rule set may be such that the specific target transmission value to be reached in the specific mode is set to be equal to the initial transmission value.

In an example, the first rule of the default rule set may be such that the default target transmission value to be reached in the default mode is a function of the current sensed amount of light. For instance, if the current sensed amount of light is greater than the initial sensed amount of light, the default target transmission value to be reached in the default mode is smaller than the initial transmission value, thus the eyeglasses (101,102) will shift from a clear state to a darker state. For instance, if the current sensed amount of light is smaller than the initial sensed amount of light, the default target transmission value to be reached in the default mode is greater than the initial transmission value, thus the eyeglasses (101,102) will shift from a dark state to a clearer state.

However, it is not required for the first rules of all rule sets to be different. Indeed, even though in some examples the target transmission value to be reached may be the same for all specific modes and for the default mode, yet the driving function may still be different whether a given specific rule set or the default rule set is applied.

For example, based on the selected rule set, a transition duration may be determined DET TGT DUR (S7) by the processing circuit (301,302). More particularly, each rule set may comprise a second rule defining a transition duration between the initial transmission value and the target transmission value.

The second rule may be different between a given specific rule set and the default rule set. Since the rule set may be selected based on the current movement of the head of the wearer, the determined transition duration may be different for instance, whether said movement matches a predefined specific movement or not.

In some examples, the second rule of the specific rule set may be such that in the corresponding specific mode, the transition duration is much longer, such that twice longer or ten times longer than the transition duration in the default mode.

In such examples, the transmission of the eyeglasses (101,102) may be adapted slowly to the variations of ambient light whenever the wearer has a specific head movement in order to minimize noticeable transmission variations which may disrupt the wearer. Moreover, in the default mode, thus whenever the wearer does not have any specific head movement, the transmission of the eyeglasses (101, 102) may be adapted as fast as possible to the variations of ambient light in order to optimize comfort of the wearer.

The transmission of the eyeglasses (101,102) is then driven DRIV T (S8) by the processing circuit based on the obtained light data and on the obtained movement data.

For example, the transmission of the eyeglasses (101,102) may be driven according to the determined control function.

This way, if the light data indicate a light variation between the initial instant and the current instant and the movement data indicate that the head of the wearer undergoes a predetermined movement, then the transmission of the eyeglasses (101,102) may be driven according to a specific mode.

Conversely, if the light data indicate a light variation between the initial instant and the current instant and the movement data does not indicate that the head of the wearer undergoes a predetermined movement, then the transmission of the eyeglasses (101,102) may be driven according to a default mode.

The combination of at least one specific mode and of the default mode allow the processing circuit (301,302) to control the transmission of the eyeglasses (101,102) so as to provide the benefits of an automated variation of transmissions whenever the ambient light conditions evolve over time, without providing unwanted transmission changes whenever the sensed amount of light evolves as a result of a head movement of the wearer rather than of an actual change in the ambient light conditions over time.

The invention claimed is:

1. An eyeglass device intended to be worn by a wearer, the eyeglass device comprising:
   a variable transmission ophthalmic lens;
   a light sensor configured to measure an amount of light in an environment of the wearer; and
   a controlling circuit configured to receive at least light data from said light sensor and to drive the transmission of said ophthalmic lens on the basis of said light data, wherein the controlling circuit is further configured to drive the transmission of said ophthalmic lens on the basis further of movement data, said movement data being derived from an estimation of a movement of the wearer's head,
   wherein, the transmission of said ophthalmic lens is equal to an initial transmission value,
   the controlling circuit is configured to:
   determine, based on the movement data, whether sensed movement of the wearer's head matches a predefined movement, then
   in case of determining an absence of a match, drive the transmission of the lens according to a first control function defining a first transmission value to be reached by the lens on the basis of said light data according to a first set of rules, the controlling circuit being thereby operated in a default mode, and
   in case of determining a match, drive the transmission of the lens according to a second control function defining a second transmission value to be reached by the lens according to a second set of rules, the controlling circuit being thereby operated in a specific mode,
   the second set of rules is different from the first set of rules, and said first and second transmission values to be reached both is different from the initial transmission value.

2. The eyeglass device of claim 1, wherein the controlling circuit is further configured to obtain the movement data by estimating the movement of the wearer's head based on the received light data.

3. The eyeglass device of claim 2, wherein the transmission of said ophthalmic lens is equal to an initial transmission value,
the controlling circuit is configured to:
determine, based on the movement data, whether the sensed movement of the wearer's head matches a predefined movement, then
in case of determining an absence of a match, drive the transmission of the lens according to a first control function defining a first transmission value to be reached by the lens on the basis of said light data according to a first set of rules, the controlling circuit being thereby operated in a default mode, and
in case of determining a match, drive the transmission of the lens according to a second control function defining a second transmission value to be reached by the lens according to a second set of rules, the controlling circuit being thereby operated in a specific mode,
the second set of rules is different from the first set of rules, and
said first and second transmission values to be reached both is different from the initial transmission value.

4. The eyeglass device of claim 1, wherein:
the device further comprises a movement sensor configured to sense a movement of the wearer's head, and
the controlling circuit is further configured to obtain the movement data by receiving, from the movement sensor, said movement data, indicating the movement of the wearer's head sensed by the movement sensor.

5. The eyeglass device of claim 4, wherein:
the device further comprises an additional movement sensor, and the controlling circuit is further configured to receive additional movement data from said additional movement sensor and to detect a characteristic movement of the head of the wearer based on both the movement data and the additional movement data.

6. The eyeglass device of claim 5, wherein, the transmission of said ophthalmic lens is equal to an initial transmission value,
the controlling circuit is configured to:
determine, based on the movement data, whether the sensed movement of the wearer's head matches a predefined movement, then
in case of determining an absence of a match, drive the transmission of the lens according to a first control function defining a first transmission value to be reached by the lens on the basis of said light data according to a first set of rules, the controlling circuit being thereby operated in a default mode, and
in case of determining a match, drive the transmission of the lens according to a second control function defining a second transmission value to be reached by the lens according to a second set of rules, the controlling circuit being thereby operated in a specific mode,
the second set of rules is different from the first set of rules, and
said first and second transmission values to be reached both is different from the initial transmission value.

7. The eyeglass device of claim 4, wherein, the transmission of said ophthalmic lens is equal to an initial transmission value,
the controlling circuit is configured to:
determine, based on the movement data, whether the sensed movement of the wearer's head matches a predefined movement, then
in case of determining an absence of a match, drive the transmission of the lens according to a first control function defining a first transmission value to be reached by the lens on the basis of said light data according to a first set of rules, the controlling circuit being thereby operated in a default mode, and
in case of determining a match, drive the transmission of the lens according to a second control function defining a second transmission value to be reached by the lens according to a second set of rules, the controlling circuit being thereby operated in a specific mode,
the second set of rules is different from the first set of rules, and
said first and second transmission values to be reached both is different from the initial transmission value.

8. The eyeglass device of claim 1, wherein, upon detection of a change of the amount of light measured by the light sensor,
said first control function varies between an initial transmission value and a target transmission value, the target transmission value to be reached being determined as a function of the amount of light measured according to a first rule of the first set of rules, and
said second control function varies between an initial transmission value and a target transmission value, the target transmission value to be reached being determined as a function of a measured illuminance according to a first rule of the second set of rules,
wherein the first rule of the first set of rules is different from the first rule of the second set of rules so that the target transmission value of the first control function is different from the target transmission value of the second control function.

9. The eyeglass device of claim 8, wherein, upon detection of a change of the amount of light measured by the light sensor:
said first control function varies between the initial transmission value and the target transmission value according to a first transition function, said first transition function defining a first transition duration for reaching the target transmission value, and
said second control function varies between the initial transmission value and the target transmission value according to a second transition function, said second transition function defining a second transition duration,
the first transition duration being different from the second transition duration.

10. The eyeglass device of claim 8, wherein the second control function is a constant function so that driving the transmission of the lens according to the second control function corresponds to keeping the transmission of the lens unchanged from the initial transmission value.

11. The eyeglass device of claim 1, wherein, upon detection of a change of the amount of light measured by the light sensor:
said first control function varies between the initial transmission value and a target transmission value according to a first transition function, said first transition function defining a first transition duration for reaching the target transmission value, and said second control function varies between the initial transmission value and the target transmission value according to a second transition function, said second transition function defining a second transition duration, the first transition duration being different from the second transition duration.

12. The eyeglass device of claim 11, wherein the second control function is a constant function so that driving the transmission of the lens according to the second control function corresponds to keeping the transmission of the lens unchanged from the initial transmission value.

13. The eyeglass device of claim 1, wherein the second control function is a constant function so that driving the transmission of the lens according to the second control function corresponds to keeping the transmission of the lens unchanged from the initial transmission value.

14. A method for driving transmission of a variable transmission ophthalmic lens, the method being implemented by a controlling circuit and comprising:
receiving, from a light sensor configured for measuring an amount of light in an environment of a wearer, at least light data from said light sensor; and
driving the transmission of said ophthalmic lens on the basis of said light data and on the basis further of movement data, said movement data being derived from estimation of movements of the wearer's head,
wherein the method further comprises, the transmission of said ophthalmic lens being equal to an initial transmission value;
determining, in absence of detection of a characteristic movement of the wearer detected based on said movement data, a first control function defining transmission values to be reached by the variable transmission ophthalmic lens on the basis of said light data according to a first set of rules, the controlling circuit being thereby operated in a default mode, and
determining, upon detection of a characteristic movement of the head of the wearer based on said movement data, a second control function defining transmission values to be reached by the variable transmission ophthalmic lens according to a second set of rules, the controlling circuit being thereby operated in a specific mode,
the second set of rules is different from the first set of rules, and
said first and second transmission values to be reached both is different from the initial transmission value.

15. The method of claim 14, wherein:
upon detection of a change of the amount of light measured based on information provided by an ambient light sensor, said first control function varies between an initial transmission value and a target transmission value, the target transmission value to be reached being determined as a function of the amount of light measured according to a first rule of the first set of rules, and said second control function varies between an initial transmission value and a target transmission value, the target transmission value to be reached being determined as a function of a measured illuminance according to a first rule of the second set of rules, wherein the first rule of the second set of rules is different from the first rule of the second set of rules so that the target transmission value of the first control function is different from the target transmission value of the second control function.

16. The method of claim 14, wherein, upon detection of a change of the amount of light measured by the light sensor:
a first control function varies between an initial transmission value and a target transmission value according to a first transition function, and
a second control function varies between the initial transmission value and the target transmission value according to a second transition function, said second transition function defining a second transition duration, a first transition duration being different from the second transition duration.

17. The method of claim 14, wherein a second function is a constant function so that an initial transmission value remains unchanged when a specific head movement is detected while a change of the amount of light is detected.

18. A non-transitory computer-readable storage medium storing a computer program that when executed by a computer causes the computer to implement a method for driving transmission of a variable transmission ophthalmic lens, the method being implemented by a controlling circuit and comprising:
receiving, from a light sensor configured for measuring an amount of light in an environment of a wearer, at least light data from said light sensor; and
driving the transmission of said ophthalmic lens on the basis of said light data and on the basis further of movement data, said movement data being derived from estimation of movements of the wearer's head,
wherein the method further comprises, the transmission of said ophthalmic lens being equal to an initial transmission value;
determining, in absence of detection of a characteristic movement of the wearer detected based on said movement data, a first control function defining transmission values to be reached by the variable transmission ophthalmic lens on the basis of said light data according to a first set of rules, the controlling circuit being thereby operated in a default mode, and
determining, upon detection of a characteristic movement of the head of the wearer based on said movement data, a second control function defining transmission values to be reached by the variable transmission ophthalmic lens according to a second set of rules the controlling circuit being thereby operated in a specific mode,
the second set of rules is different from the first set of rules, and
said first and second transmission values to be reached both is different from the initial transmission value.

* * * * *